Aug. 22, 1967      R. H. ARMACOST      3,336,822
LOCK COLLAR FOR DRILL BUSHINGS
Filed May 11, 1965      2 Sheets-Sheet 1
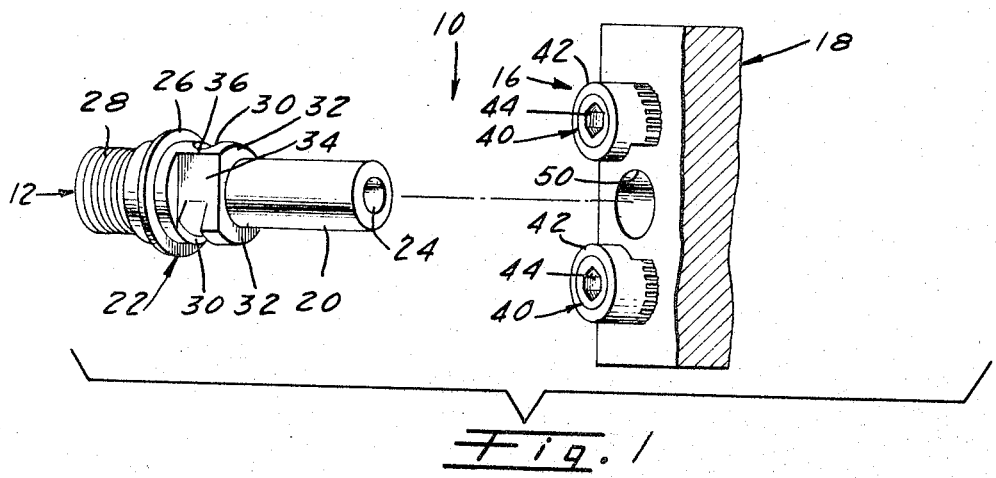
Fig. 1
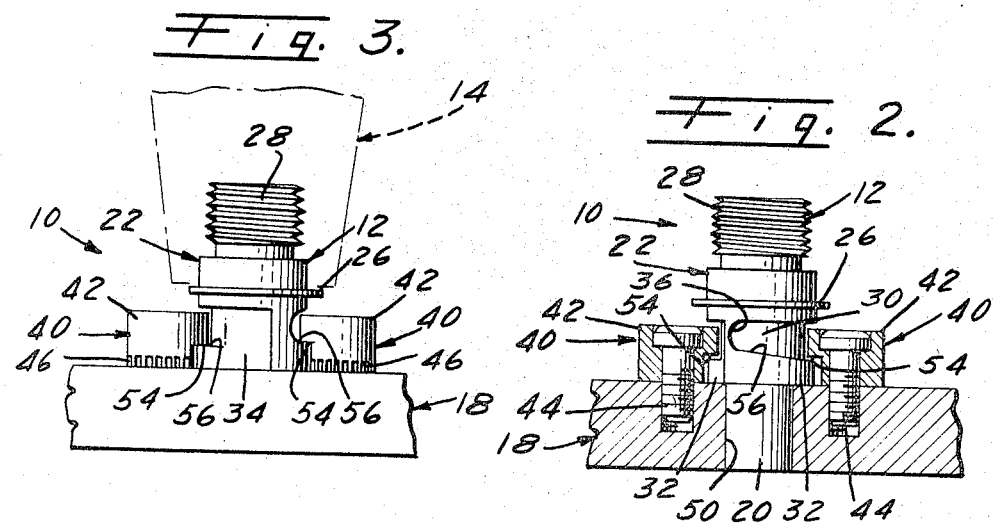
Fig. 3.
Fig. 2.
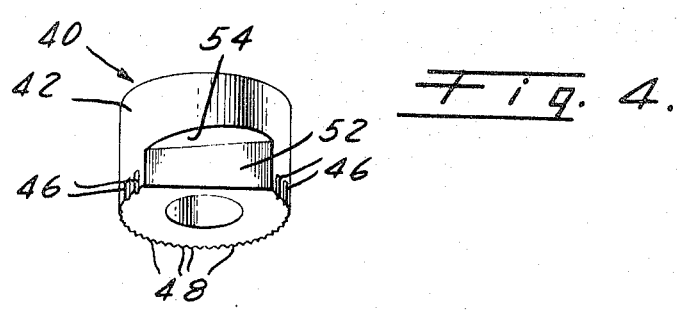
Fig. 4.
Inventor,
Robert H. Armacost
by Beehler & Arant
Attorneys

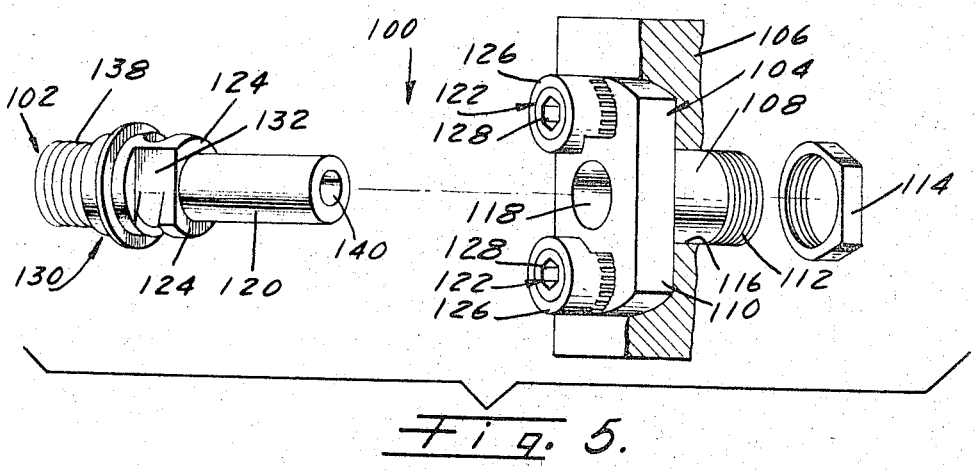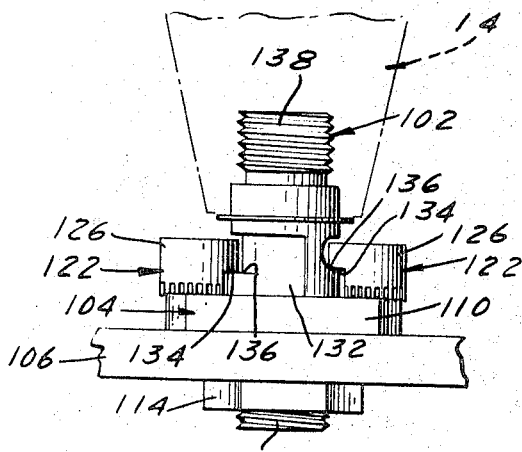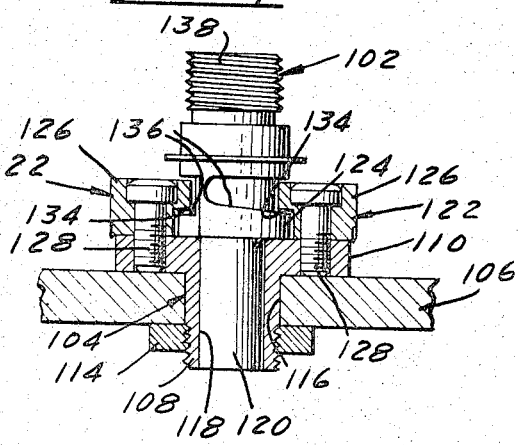

United States Patent Office 3,336,822
Patented Aug. 22, 1967

3,336,822
LOCK COLLAR FOR DRILL BUSHINGS
Robert H. Armacost, Los Angeles, Calif., assignor to American Drill Bushing Co., Los Angeles, Calif., a corporation of Maryland
Filed May 11, 1965, Ser. No. 454,856
10 Claims. (Cl. 77—62)

This invention relates generally to drill bushings and has more particular reference to improvements in lock bushing assemblies of the type which permit a drilling tool to be quickly and easily locked to a drill jig at the outset of the drilling operation and released from the drill jig at the conclusion of the drilling operation.

Lock bushing assemblies of the general type to which this invention pertains have been in wide-spread use for a number of years. Generally speaking, these lock bushing assemblies include two basic components, to wit, a so-called drill bushing tip to be mounted on the drilling tool and bushing tip lock means to be secured to a drill jig for cooperation with the bushing tip to releasably lock the latter, and thereby the drilling tool, to the jig during each drilling operation. This invention is more directly concerned with one particular type of existing lock bushing assembly that is subject to a defect which this invention seeks to cure. Briefly, the lock bushing assembly referred to here comprises a drill bushing tip including an anterior cylindrical shank to be slidably inserted into a bushing bore in a drill jig and an enlarged posterior collar which is externally threaded for connection to the drilling tool. This collar is formed with two circumferentially spaced locking flanges separated by peripheral recesses or flats on the collar. The bushing lock means of this bushing assembly comprises one, and in most cases two, lock screws to be fixed to the rear side of the drill jig, at diametrically opposite sides of the bushing tip receiving bore therein. In most cases, these lock screws may be threaded directly into the drill jig, in which event the jig itself contains the bushing tip receiving bore. In some cases the lock screws are threaded into a so-called lock liner bushing which is inserted into a liner receiving bore in the drill jig. In this event, the lock liner bushing contains the bushing tip receiving bore. The lock screws include flat, disklike heads which are axially spaced a predetermined distance from the rear surface of the jig or from the rear surface of the lock liner bushing, as the case may be, when the lock screws are installed on the jig.

When a drilling operation is to be commenced, the anterior cylindrical shank of the drill bushing tip is inserted into the bushing tip receiving bore, and the tip is rotated to a postion wherein the flats on its posterior collar are aligned with the lock screws. The tip is then axially advanced into the bushing bore to a position wherein the collar seats against the rear surface of the jig or the rear surface of the lock liner bushing, after which the tip is rotated to a locked position wherein its locking flanges engage under the lock screw heads. The drilling tool is thereby effectively rigidly locked to the drill jig in alignment with the bushing bore therein. The tool is released from the drill jig by rotating the drill bushing tip in the opposite direction to disengage its locking flanges from the lock screw heads and then axially retracting the tip from the bushing bore.

As noted earlier, the existing lock bushing assembly of this type possesses one deficiency which the present invention seeks to cure. This deficiency resides in the fact that the lock screw head engaging surfaces of the locking flanges on the drill bushing tip are inclined, that is disposed in a plane inclined to the axis of the tip, in such manner that when the tip is rotated to its locked position, the flanges wedge themselves tightly between the lock screw heads and the confronting rear surface of the jig or lock liner bushing, as the case may be. This wedging action has the three-fold advantage of limiting rotation of the drill bushing tip in its locking direction, firmly securing the tip to the drill jig, and absorbing both the axial thrust and torque of the drilling operation. In the existing lock bushing assembly, however, while the lock screw head engaging surfaces of the bushing tip locking flanges are inclined, as stated above, the flange engaging surfaces of the lock screw heads are disposed in planes which are normal to the axis of the bushing tip when the latter is installed in the drill jig. As a consequence, essentially point contact exists between these engaging surfaces, which, for convenience, will hereinafter be referred to as locking surfaces. Accordingly, repeated locking of the drill bushing tip to and unlocking of the tip from the drill jig, as occurs in the normal course of use of such a lock bushing assembly, results in rapid wear of the locking surfaces. The lock screws and/or the bushing tip must therefore be replaced at relatively frequent intervals.

It is a general object of this invention to provide an improved lock bushing assembly of the character described which is not subject to the deficiency discussed above.

A more specific object of the invention is to provide an improved lock bushing assembly of the character described wherein the coacting locking surfaces on the tool mounted drill bushing tip and the jig mounted lock structure of the assembly are both inclined in such a way as to establish extended surface contact between these locking surfaces when the bushing tip occupies its locked position relative to the lock structure, thereby to minimize wear of the locking surfaces.

Other objects, advantages, and features of the invention will become readily apparent as the description proceeds.

With these and other objects in view, the invention consists in the construction, arrangement and combination of the various parts of the invention, whereby the objects contemplated are attained, as hereinafter set forth, pointed out in the appended claims, and illustrated in the accompanying drawings.

In these drawings:

FIGURE 1 is an exploded perspective view of a presently preferred embodiment of the present lock bushing assembly;

FIGURE 2 is a section through the lock bushing assembly of FIGURE 1 in its assembled and unlocked condition;

FIGURE 3 is a side elevation illustrating the bushing assembly in its locked condition;

FIGURE 4 is an enlarged perspective view of one element of the jig mounted lock structure embodied in the lock bushing assembly of FIGURES 1–3;

FIGURE 5 is an exploded perspective view of an alternate embodiment of the present improved lock bushing assembly, including a lock liner bushing which is illustrated as being installed in a drill jig;

FIGURE 6 is a section through the lock bushing in FIGURE 5 showing the bushing in its assembled and unlocked condition;

FIGURE 7 is a side elevation showing the lock liner bushing of FIGURE 5 in its locked condition.

The improved lock bushing assembly 10 illustrated in FIGURES 1–4 of these drawings comprises a drill bushing tip 12 adapted for attachment to drilling tool 14 and bushing tip lock means 16 adapted for attachment to a drill jig 18. Drill bushing tip 12 includes an anterior cylindrical shank 20 and a posterior collar which is generally designated by the reference numeral 22. Extending centrally through the tip is a bore 24 which is adapted to receive and slidably journal the tool bit (not shown) which is mounted on the drilling tool 14. This tool bit may be a drill, tap, or other rotary tool bit. The anterior shank 20 of the drill bushing tip 12 has a smooth external cylindrical surface of uniform diameter. The posterior collar 22 of the drill bushing tip includes a central radial flange 26 and a rear externally threaded extremity 28. Forwardly of the flange 26, the collar 22 is formed with a pair of diametrically opposed, circumferentially extending grooves 30 which define a pair of diametrically opposed locking or camming flanges 32 on the forward extremity of the collar. The collar is peripherally machined between the adjacent ends of these grooves to form flats 34. One end of each collar groove 30 opens through the adjacent flat. The other end of each collar groove is separated from the adjacent flat by an endwall 36. As may be observed in the drawings, the open end of each groove is located diametrically opposite the closed end of the other groove. Preferably, the intersection, at the open end of each groove, between the bottom wall of that groove and the adjacent flat is rounded to provide a smooth transition region between the respective groove wall and flat.

If desired, the drill bushing tip 12 may be machined in one piece from bar stock. According to the preferred method of fabricating the tip, however, the shank is machined separately from the tip and then heat treated, after which the shank is press fitted into the collar.

The jig mounted lock means 16 of the lock bushing assembly 10 comprises a pair of lock members or cams 40 which cooperate with the locking flanges 32 on the drill bushing tip 12 to releasably lock the latter to the drill jig 18. These lock members are uniquely constructed in accordance with the present invention and constitute the major contribution of the invention. Each lock member comprises a heat treated lock sleeve 42 which is centrally bored and counterbored, as shown, to receive a mounting screw 44. This screw is threaded into the drill jig 18 in such a way as to clamp the lock sleeve tightly against the jig, thereby to secure the sleeve against rotation relative to the jig. For reasons which will appear presently, it is essential to proper operation of the present lock bushing assembly 10 that the lock sleeves 42 remain fixed in the angular positions shown relative to the drill jig 18. For this reason, it is not desirable to rely solely on frictional contact between the drill jig and the lock sleeves to retain the latter against rotation.

According to the present invention, positive retention of the lock sleeves 42 against rotation is accomplished by coining circumferentially spaced serrations or indentations 46 into the cylindrical surface of each sleeve, adjacent the end thereof which seats against the drill jig 18. This coining operation is performed on each lock sleeve in such a way that the metal of the sleeve which is displaced by the formation of each indentation flows axially beyond the adjacent end face of the sleeve, thereby to form a multiplicity of axially projecting spurs 48 about the serrated end of the sleeve. When the lock sleeves are secured to the drill jig by tightening the mounting screws 44 these spurs bite into the rear face of the jig to positively restrain the sleeves against turning.

The lock sleeves 42 are located at diametrically opposite sides of a bushing tip receiving bore 50 in the drill jig 18 and are equally radially spaced from the axis of this bore. The radial clearance between the lock sleeves, that is the distance, measured in a plane containing sleeve axes, between the intersection of this plane and the cylindrical outer surfaces of the sleeves, is slightly greater than the width of the collar 22 on the drill bushing tip 12, measured between and normal to the flats 34 on the collar. It is apparent, therefore, that the drill bushing tip may be inserted into the drill jig 18 to the position of FIGURE 2, wherein the forward annular face of the bushing tip collar seats against the rear face of the jig.

Each lock sleeve 42 is peripherally cut away or slotted at 52 to define a locking or camming shoulder 54 facing and axially spaced from the rear face of the drill jig 18. The two lock sleeves are oriented so that the cut-outs or slots 52 on the sleeves face one another, as shown. The lock sleeves 42 are radially spaced from the axis of the bore 50 in the drill jig a distance such that when the drill bushing tip 12 is inserted to its position of FIGURE 2 in the jig and then rotated in one direction, the locking flanges 32 on the tip engage under the locking shoulders 54 on the lock sleeves, as shown in FIGURE 3, thereby to lock the tip against axial disengagement from the jig. In the ensuing description, the position of the drill bushing tip illustrated in FIGURE 2 is referred to its unlocked position, and the position of the tip illustrated in FIGURE 3 is referred to as its locked position.

It will be observed in the drawings that when the drill bushing tip 12 occupies its locked position of FIGURE 3, the rearwardly presented surfaces 56 on the locking flanges 32 of the tip confront the forwardly presented locking shoulders or shoulder surfaces 54 on the lock sleeves 42. In the ensuing description, these surfaces are referred to as locking surfaces. According to the present invention, the locking surfaces 56 on the drill bushing tip 12 are disposed in planes inclined to the axis of the tip and the locking surfaces 54 on the lock sleeve 42 are disposed in planes inclined to the axis of the drill jig bore 50 in such manner that when the drill bushing tip is rotated from its unlocked position of FIGURE 2 to its locked position of FIGURE 3, the locking flanges 32 are wedged tightly between the sleeve locking surfaces 54 and the drill jig 18. This wedging action firmly locks the drill bushing tip to the jig, and in addition, frictionally limits relative locking rotation of the tip relative to the jig. The slot end walls 36 on the tip provide positive stops for limiting locking rotation of the tip. According to the feature of the invention under discussion, the slope of the locking surfaces 54 and 56 is such that when the drill bushing tip is inserted into the jig bore 50, each tip locking surface 56 parallels its respective sleeve locking surface 54. Accordingly, when the drill bushing tip is rotated to its locked position of FIGURE 3, each tip locking surface 56 flatly engages its respective sleeve locking surface 54, whereby the wear of these locking surfaces occasioned be repeated locking and unlocking the drill bushing tip 12 is materially reduced.

In use of the present lock bushing assembly 10, the threaded extremity 28 of the drill bushing tip 12 is screwed into the nose end of the drilling tool 14 so that the drill or other tool bit mounted on the drilling tool extends through and is journaled in the central bore 24 in the tip. When a drilling operation is to be commenced, the shank 20 of the drill bushing tip is inserted into the bore 50 in the drill jig 18 and the tip is rotated to align its flats 34 with the lock sleeves 42. The drilling tool is then axially advanced toward the drill jig to move the drill bushing tip to its unlocked position of FIGURE 2, after which the drilling tool is rotated to rotate the tip to its locked position of FIGURE 3. In this locked condition of the lock bushing assembly 10, the assembly effectively holds the drilling tool 14 in alignment with the drill jig and absorbs both the axial thrust and torque of the rotating tool bit. The drilling tool is removed from the drill jig by first rotating the tool in a direction to rotate the drill bushing tip 12 to its unlocked position of FIGURE 2 and then retracting the drilling tool rearwardly to withdraw the drill bushing tip from the jig.

The modified lock bushing assembly 100 illustrated in FIGURES 5–7 of the drawings comprises a drill bushing tip 102 and a lock liner bushing 104 for receiving the bushing tip. The bushing tip 102 is identical in every respect to the bushing tip 12 described earlier and, accordingly, a detailed description of the bushing tip 102 is unnecessary. The lock liner bushing 104 is adapted to be mounted on a drill jig 106 in the manner explained below.

Lock liner bushing 104 includes an anterior bushing sleeve 108 and an enlarged flat posterior head 110. A forward end of the bushing sleeve is externally threaded at 112 to receive a nut 114. When installing the lock liner bushing in the drill jig 106, the bushing sleeve 108 is inserted through a bore 116 in the jig. The liner bushing is then rigidly secured to the jig by threading the nut 114 on the bushing sleeve and clamping the nut tightly against the rear surface of the jig. Extending axially through the lock liner bushing is a bore 118 which is proportioned to receive the anterior cylindrical shank 120 of the drill bushing tip 102 with a close sliding fit.

Secured to the rear face of the lock liner bushing head 110 are a pair of lock members or cams 122 which cooperate with the locking or camming flanges 124 on the drill bushing tip 102 to releasably lock the tip to the lock liner bushing 104. These lock members or cams are identical to the lock members or cams 40 in the first form of the invention and comprise lock sleeves 126 which are secured, by mounting screws 128, to the rear face of the lock liner bushing head 110. The lock sleeves 126 are located at diametrically opposite sides of the bushing tip receiving bore 116 in the lock liner bushing 104 and are equally radially spaced from the axis of this bore. The radial clearance between the lock sleeve is slightly greater than the width of the collar 130 on the drill bushing tip 102, measured between and normal to the flats 132 on the collar. It is apparent, therefore, that if the drill bushing tip 102 is rotated to align its flats 132 with the lock sleeves 126, the tip may be inserted into the lock liner bushing 104 to its unlocked position of FIGURE 6 wherein the forward annular face of the bushing tip collar 130 seats against the rear face of the lock liner bushing head 110. When the bushing tip is now rotated to its locked position of FIGURE 7, the locking flanges 124 on the tip are wedged under the locking shoulders 134, thereby to firmly secure the tip to the lock liner bushing. As in the previous form of the invention, the slope of the locking shoulders or surfaces 134 on the lock sleeves 126 and the slope of the locking surfaces 136 on the locking flanges 124 of the bushing tip 102 are such that when the tip is inserted into the lock liner bushing, the locking surfaces parallel one another. Accordingly, when the drill bushing tip is rotated to its locked position of FIGURE 7, the locking surfaces 134, 136 are disposed in flat surface engagement whereby wear of these locking surfaces occasioned by repeated locking and unlocking of the bushing tip is materially reduced.

The lock bushing assembly 100 just described is used in much the same way as the first described form of the bushing assembly. Thus, the threaded extremity 138 of the drill bushing tip 102 is screwed into the nose of a drilling tool 14 in such manner that the drill or other tool bit mounted on the tool extends through and is journaled in the central bore 140 in the tip. The lock liner bushing 104 is secured to the drill jig 106 in the manner described above. When a drilling operation is to be commenced, the anterior cylindrical shank 120 of the drill bushing tip 102 is axially inserted into the lock liner bushing bore 118 to its unlocked position of FIGURE 6. The drilling tool is then rotated to rotate the bushing tip to its locked position of FIGURE 7. In this locked position, the drill bushing assembly 100 effectively holds the drilling tool in alignment with the drill jig and absorbs both the axial thrust and torque of the rotating tool bit, as before. The drilling tool is removed from the drill jig by first rotating the tool to rotate the drill bushing tip to its unlocked position of FIGURE 6 and then axially retracting the drill bushing tip from the lock liner bushing.

While the invention has herein been shown and described in which is presently conceived to be two of its most practical and preferred embodiments, it is recognized that departures may be made therefrom within the scope of the invention, which is not to be limited to the details disclosed herein, but is to be accorded the full scope of the claims so as to embrace any and all equivalent devices.

Having described the invention, what is claimed as new in support of Letters Patent is:

1. A lock bushing assembly comprising: a drill bushing tip including an anterior cylindrical shank and a radial locking flange at the rear of said shank and circumferentially extending partway around the shank, a lock member having a radial locking shoulder, means for securing said lock member to a drill jig having a bore to receive said bushing tip shank in such manner that said bushing tip is rotatable relative to said lock member between an unlocked position wherein said locking flange clears said locking shoulder to permit axial withdrawal of the bushing tip from and axial insertion of the bushing tip into said drill jig, and a locked position, wherein said locking flange engages under said locking shoulder, thereby to releasably lock said bushing tip to the drill jig, and said locking flange and locking shoulder having engageable locking surfaces which are inclined in such manner that said locking surfaces flatly engage one another when said bushing tip occupies said locked position thereof.

2. A lock bushing assembly according to claim 1 wherein: said lock member comprises a lock sleeve which is peripherally slotted to define said locking shoulder, and said securing means comprises a fastener rotatably mounting said lock sleeve.

3. A lock bushing assembly according to claim 1 wherein: said lock member comprises a lock sleeve which is peripherally slotted to define said locking shoulder, said securing means comprising a fastener rotatably mounting said lock sleeve, and spurs projecting from the end of said lock sleeve remote from said locking shoulder.

4. A lock bushing assembly comprising: a drill bushing tip including an anterior cylindrical shank and a radial locking flange at the rear of said shank and circumferentially extending partway around the shank, a lock liner bushing having a bore to slidably receive said shank, a lock member secured to the rear end of said lock liner bushing and having a radial locking shoulder axially spaced from the rear end face of said liner bushing, said drill bushing tip, when inserted in said lock liner bushing, being relatively rotatable between an unlocked position wherein said locking flange clears said locking shoulder, thereby to permit axial withdrawal of said tip from said lock liner bushing, and a locked position, wherein said locking flange engages under said locking shoulder, thereby to releasably lock said tip to said lock liner bushing, said locking shoulder and flange having engageable locking surfaces, and the locking surface on said tip being disposed in a plane inclined to the axis of the tip and the locking surface on said lock member being disposed in a plane inclined to the axis of said bore in such manner that said locking surfaces flatly engage one another when said drill bushing tip occupies said locked position thereof.

5. A lock bushing assembly according to claim 4 wherein: said lock member comprises a lock sleeve which is peripherally slotted to define said locking shoulder, and a fastener rotatably mounting said lock sleeve for clamping the lock sleeve tightly against the rear face of said lock liner bushing, thereby to secure said lock sleeve against rotation relative to said liner bushing.

6. A lock bushing assembly according to claim 4 wherein: said lock member comprises a lock sleeve which is peripherally slotted to define said locking shoulder, a fastener rotatably mounting said lock sleeve for firmly clamping the latter against the rear face of said lock liner bushing, and said lock sleeve having spurs projecting beyond the end thereof engageable with said liner bushing which bite into said liner bushing, thereby to restrain said lock sleeve against rotation.

7. A lock bushing assembly comprising: a drill bushing tip including an anterior cylindrical shank and an enlarged posterior collar at the rear of said shank, said collar having a pair of diametrically opposed radial locking flanges separated by intervening flats on said collar, a pair of lock sleeves each peripherally slotted to define a locking shoulder on one end of the respective sleeve, fasteners extending through said lock sleeves for securing said lock sleeves to a drill jig having a bore to receive said bushing tip shank in such manner that said bushing tip, when inserted into said receiving bore, is rotatable relative to said lock sleeves between an unlocked position wherein said locking flanges clear said locking shoulders to permit axial withdrawal of said bushing tip from and axial insertion of the bushing tip into said receiving bore, and a locked position wherein said locking flanges engage under said locking shoulders, thereby to releasably lock said bushing tip to the drill jig, said locking flanges and locking shoulders having engageable locking surfaces, and said flange locking surfaces being disposed in planes inclined to the axis of said bushing tip shank and said shoulder locking surface on each lock sleeve being disposed in a plane inclined to the axis of the respective lock sleeve in such manner that said locking surfaces flatly engage one another when said bushing tip occupies said locked position thereof.

8. A lock bushing assembly according to claim 7 including: spurs projecting from the end of each said lock sleeve remote from said locking shoulder thereof.

9. A lock bushing assembly comprising: a drill bushing tip including an anterior cylindrical shank and an enlarged posterior collar at the rear of said shank, said collar having a pair of diametrically opposed radial locking flanges separated by intervening flats on said collar, a lock liner bushing having a rearwardly presented surface and a bore opening through said surface to slidably receive said shank, a pair of lock sleeves seating at one end against said surface at diametrically opposite sides of said bore, fasteners extending through said lock sleeves and rigidly securing said lock sleeves to said lock liner bushing, said lock sleeves being peripherally slotted to define lock shoulders at the other ends of said sleeves, said lock shoulders extending toward one another in such manner that when said drill bushing tip is inserted into said lock liner bushing, said bushing tip is rotatable relative to said lock liner bushing between an unlocked position wherein said locking flanges clear said locking shoulders to permit axial withdrawal of said tip from and axial insertion of said tip into said lock liner bushing, and a locked position wherein said locking flanges engage under said locking shoulders to releasably lock said bushing tip to said lock liner bushing, said locking flanges and locking shoulders having engageable locking surfaces, and said flange locking surfaces being disposed in planes inclined to the axis of said bushing tip shank and said shoulder locking surfaces being disposed in planes inclined to the axis of said bore in such manner that said locking surfaces flatly engage one another when said drill bushing tip occupies said locked position thereof.

10. A lock member for a lock bushing assembly of the character described comprising: a lock sleeve having a peripheral slot at one end thereof defining a radial locking shoulder at the other end of the sleeve, said shoulder having a locking surface facing said one end of the sleeve and disposed in a plane inclined to the axis of the sleeve, said sleeve having spurs projecting beyond said one end thereof, and a fastener rotatably mounting said sleeve.

References Cited

UNITED STATES PATENTS 2,558,814   7/1951   Briney _____ 77—62

FRANCIS S. HUSAR, *Primary Examiner.*